United States Patent
Smith et al.

(10) Patent No.: US 7,528,525 B2
(45) Date of Patent: May 5, 2009

(54) DAMPING AND STABILIZATION FOR LINEAR MOTOR STAGE

(75) Inventors: James F. Smith, Smithtown, NY (US); Devarajan Rajaraman, Melville, NY (US); Sachchit Ambaji Patil, Deer Park, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 11/925,257

(22) Filed: Oct. 26, 2007

(65) Prior Publication Data

US 2008/0051942 A1    Feb. 28, 2008

Related U.S. Application Data

(63) Continuation of application No. 11/548,594, filed on Oct. 11, 2006, now Pat. No. 7,288,872, which is a continuation of application No. 10/901,667, filed on Jul. 29, 2004, now Pat. No. 7,138,747.

(51) Int. Cl.
*H01L 41/08* (2006.01)
(52) U.S. Cl. .................. 310/317; 310/316.01; 310/321
(58) Field of Classification Search ............ 310/316.01, 310/338, 317, 321
See application file for complete search history.

(56) References Cited

U.S. PATENT DOCUMENTS

| | | | |
|---|---|---|---|
| 4,565,940 A | | 1/1986 | Hubbard, Jr. |
| 4,795,123 A | | 1/1989 | Forward et al. |
| 4,849,668 A | * | 7/1989 | Crawley et al. ............. 310/328 |
| 4,940,914 A | * | 7/1990 | Mizuno et al. ............. 310/326 |
| 5,058,433 A | | 10/1991 | Wilson et al. |
| 5,214,341 A | | 5/1993 | Itoh et al. |
| 5,270,607 A | * | 12/1993 | Terajima ................ 310/316.01 |
| 5,525,853 A | * | 6/1996 | Nye et al. ............... 310/316.01 |
| 5,558,477 A | | 9/1996 | Browning et al. |
| 6,025,671 A | | 2/2000 | Boecking |
| 6,095,547 A | * | 8/2000 | Vandergrift et al. ......... 280/602 |
| 6,310,746 B1 | | 10/2001 | Hawwa et al. |
| 6,378,672 B1 | * | 4/2002 | Wakui ........................ 188/378 |
| 6,510,738 B1 | | 1/2003 | Lee et al. |
| 6,533,257 B1 | | 3/2003 | Clark |
| 6,563,250 B2 | * | 5/2003 | Mathur .................. 310/316.01 |

(Continued)

FOREIGN PATENT DOCUMENTS

JP    08-326835    12/1996

(Continued)

OTHER PUBLICATIONS

Cristina E. Beldica, et al.; Viscoelastic Damping and Piezo-Electric Control of Structures Subjected to Aerodynamic Noise; Republic of Singapore, 1999.

(Continued)

*Primary Examiner*—Thomas M Dougherty
(74) *Attorney, Agent, or Firm*—Amin Turocy & Calvin LLP; Alexander R. Kuszewski

(57) ABSTRACT

A system that facilitates damping of mechanical vibration associated with machinery that is subject to such mechanical vibration. The system comprises machinery with at least one moveable part and a piezoelectric actuator that is selectively applied to the machinery. The piezoelectric actuator receives voltages and is employed to facilitate damping of mechanical vibration associated with the machinery.

18 Claims, 14 Drawing Sheets

U.S. PATENT DOCUMENTS

| | | |
|---|---|---|
| 6,707,230 B2 | 3/2004 | Smith et al. |
| 6,841,192 B2 | 1/2005 | Hashimoto et al. |
| 7,098,578 B2 * | 8/2006 | Lammer .................... 310/338 |
| 7,138,747 B1 * | 11/2006 | Smith et al. ................ 310/317 |
| 7,288,872 B2 * | 10/2007 | Smith et al. ................ 310/317 |

FOREIGN PATENT DOCUMENTS

| | | |
|---|---|---|
| JP | 11-008181 | 1/1999 |
| WO | 00/45067 | 8/2000 |

OTHER PUBLICATIONS

European Search Report dated Nov. 17, 2005 and mailed Nov. 17, 2005 for European Application Serial No. 05014304, 3 pages.

Patent Abstracts of Japan. JP 09313474 (Mar. 31, 1998) vol. 4., 7 pages.

* cited by examiner

DAMPING AND STABILIZATION FOR LINEAR MOTOR STAGE

CROSS-REFERENCE TO RELATED APPLICATIONS

This application is a continuation of U.S. application Ser. No. 11/548,594, filed Oct. 11, 2006, entitled DAMPING AND STABILIZATION FOR LINEAR MOTOR STAGE, which is a continuation of U.S. application Ser. No. 10/901,667, filed Jul. 29, 2004, entitled DAMPING AND STABILIZATION FOR LINEAR MOTOR STAGE. The entireties of these applications are incorporated herein by reference.

TECHNICAL FIELD

The present invention relates to damping mechanical vibration associated with moveable machinery. More particularly, the invention relates to a system and/or methodology facilitating active damping of mechanical vibration in moveable machinery via piezo-electric actuators.

BACKGROUND OF THE INVENTION

Mechanical vibration can be extremely problematic within applications requiring abrupt stopping and/or starting. For example, gantries typically require such movement, as a gantry beam is employed to position a tool over a particular surface. As applications have required length of the gantry beams to increase, amplitude of mechanical vibration upon the gantry beams (and thus the tool) likewise increases. Because various applications (e.g., surface monitoring of large flat-panel television screens) presently require beams of considerable length, mechanical vibration occurring during operation of the gantry (e.g., abrupt stopping and/or starting) can become substantial on the gantry beam. Such mechanical vibration can result in damage to the tool as well as decreased application efficiency, as the application must be delayed until the mechanical vibration has settled. If the application continues while a large amount of mechanical vibration remains, quality of the application will be compromised and the tool can suffer considerable damage. Similarly, other moveable machinery/equipment and/or machinery/equipment that facilitates movement such as conveyors, motors, pumps, chucks, rails, generators, tracks, chucks, housings, platforms, and various other vibration sensitive devices can be subject to unwanted mechanical vibration due to such movement.

Monitoring acceleration, velocity, and deceleration of a gantry beam as it moves along a stationary frame, and comparing vibration corresponding to such parameters to determine optimal operation of the gantry given a particular application is one conventional method for limiting vibration (e.g., a maximum acceleration, velocity and/or deceleration of a gantry beam that results in an allowable amount of vibration is determined). Such a method, however, does not allow gantry applications to be completed with optimal efficiency, and throughput is negatively affected. Various feedback systems have also been used in an attempt to reduce mechanical vibration associated with gantry arms and/or beams as well as other moveable machinery/equipment. For example, position and overshoot of a gantry beam can be determined via joint sensors, and such position and overshoot can be fed back to a control system. The control system thereafter directs drive motors to apply a counterforce, thereby damping vibration resulting from starting and/or stopping the gantry beam. Such systems typically are subject to significant wear and are expensive, and are furthermore often ineffective, as response of the drive motors is not sufficient to control transient overshoot vibration.

Passive damping mechanisms, including washers, pads, and other forms of mounts to facilitate reduction of high and low resonance frequency vibrations, have also been utilized in connection with damping resonance resulting from stopping and/or starting machinery such as a gantry beam. Such mechanisms are simple and inexpensive, but are unable to adjust to changing needs of an application.

Increased capabilities and decreased cost of linear motors further renders conventional methods insufficient for damping mechanical vibrations associated with gantry beams driven by such linear motors. For example, velocity of a linear motor is currently limited only by available bus voltage and speed of control electronics. Furthermore, response rate of a linear motor driven device can be over 100 times that of a mechanical transmission, resulting in faster accelerations and settling times. Because extensions from gantries have become greater in length (e.g., gantry beams employed within a gantry), and current applications require sensitive positioning (e.g., optical scanning of flat-panel televisions on a micron level), there exists a strong need in the art for a system and/or methodology that facilitates improved damping of mechanical vibration associated with gantry operations.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates damping of mechanical vibration associated with operation of machinery/equipment such as a gantry beam, and overcomes many of the aforementioned deficiencies related to conventional damping systems and/or methodologies. While the description provided herein focuses on actively damping mechanical vibrations associated with a gantry beam, it is to be understood that one or more aspects of the present invention can be employed with any suitable moving machinery and/or equipment. The subject invention employs piezoelectric actuators in connection with machinery and/or equipment to damp mechanical vibration associated therewith. For example, piezoelectric actuators that have sufficient piezoelectric properties can be selectively positioned on a gantry beam to damp vibration associated therewith. Piezoelectric materials produce a voltage when subjected to mechanical stress and/or strain, and also distort during instances that a voltage is applied. Distortion can be controlled via applying appropriate voltages to particular areas of piezoelectric materials. Piezoelectric actuators can facilitate damping of mechanical vibration associated with starting and/or stopping machinery (e.g., a gantry beam) via distorting to generate a force opposite in direction (counterforce) from a force associated with the vibration. For example, distortion can occur in a substantially similar direction as a desired counterforce. Utilizing these piezoelectric actuators, a faster settling time and greater throughput can be achieved when compared to conventional vibration damping systems. Piezoelectric actuators can also be applied to motors (e.g., linear motors) that are employed to drive a gantry beam across a frame. More particularly, piezoelectric actuators can be selectively applied to the linear motors and be associated with a control system, wherein the control system effectuates monitoring the piezoelectric actuators to determine a level of distortion that will effectively dampen vibration associated with a gantry arm.

Various sensors can be provided to monitor a plurality parameters relating to moveable machinery/equipment such as, for example, a gantry. For instance, parameters that can be measured upon a gantry can be position, velocity, acceleration, deceleration, etc. of a gantry bean associated with the gantry. Moreover, piezoelectric actuators that are selectively applied to the gantry beam and/or linear motor(s) that drive such gantry beam can be monitored by a voltmeter or other suitable voltage measuring device, as voltages are created according to stress and/or strain on the piezoelectric actuators (indicating starting and/or particular operations of the gantry beam). An appropriate voltage can thus be applied to the piezoelectric actuators based at least in part on parameters monitored by the sensors and voltages released by the piezoelectric actuators. This deliverance of voltage to the piezoelectric actuators results in distortion of such actuators, which generate forces that can be employed to damp vibrations associated with a gantry beam.

A control component can also be employed to govern actions of machinery/equipment (such as a gantry beam). In accordance with one aspect of the present invention, the control component can comprise a computing component, wherein the computing component delivers commands to a gantry based upon pre-defined application characteristics (e.g., a computer program dictating positioning, velocity, acceleration, and deceleration of a gantry beam), parameters monitored by various sensors, voltages released form piezoelectric actuators, etc. The control component can utilize open-loop and closed-loop control algorithms, PID controllers, feed back and feed forward algorithms, etc. Alternatively, the control component can comprise a human, wherein the human dictates operation of a gantry via a human machine interface (either mechanical or electrical). For example, a human can depress a button to abruptly stop a linear motor.

In accordance with one aspect of the present invention, the control component utilizes received parameters from various sensors and voltages released from piezoelectric actuators to determine an appropriate voltage to apply to the piezoelectric actuators, thereby generating a desirable distortion. The distortion creates a counterforce that can be employed to damp mechanical vibration associated with starting and/or stopping a gantry beam. Moreover, memory can be provided to store and/or organize data to facilitate optimal damping of mechanical vibration associated with various machinery, such as a gantry, motor, chuck, conveyor, track, pumps, conveyors, rails, generators, or any other suitable equipment/machinery that is subject to mechanical vibration. For example, monitored parameters and corresponding voltages applied to the piezoelectric actuators can be stored in a table format in the memory. Upon a recurrence of the monitored parameters, a voltage desirably applied to the piezoelectric actuators can be read directly from the table rather than calculating appropriate voltages within a control system (e.g., a PID controller). Such table can facilitate reduction in delays associated with control systems and sensors.

In accordance with one aspect of the present invention, a gantry comprises a gantry beam with piezoelectric actuator selectively applied thereto, wherein the gantry beam is driven by one or more linear motor. The linear motor(s) effectuate moving a tool to a desirable position (at a desirable rate) within a plane. For example, the tool can be an optical scanning device employed to determine quality of a large flat-panel screen (e.g., a plasma television). At least one linear motor within the gantry is utilized to drive the gantry beam along a frame. Magnitude of vibration along the beam increases as length of the beam increases. Piezoelectric actuators can be selectively applied to the gantry beam to effectuate damping of mechanical vibrations that are associated with such beam. Furthermore, piezoelectric actuators can be applied to the motors driving the gantry beam, thereby further reducing vibration in the beam and effectuating improved application efficiency and quality. This damping of vibrations allows avoidance of wear to the tool, as the tool will be subject to less mechanical vibration when the present invention is employed, increases throughput, and renders gantry applications more consistent than when conventional damping mechanisms are employed.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
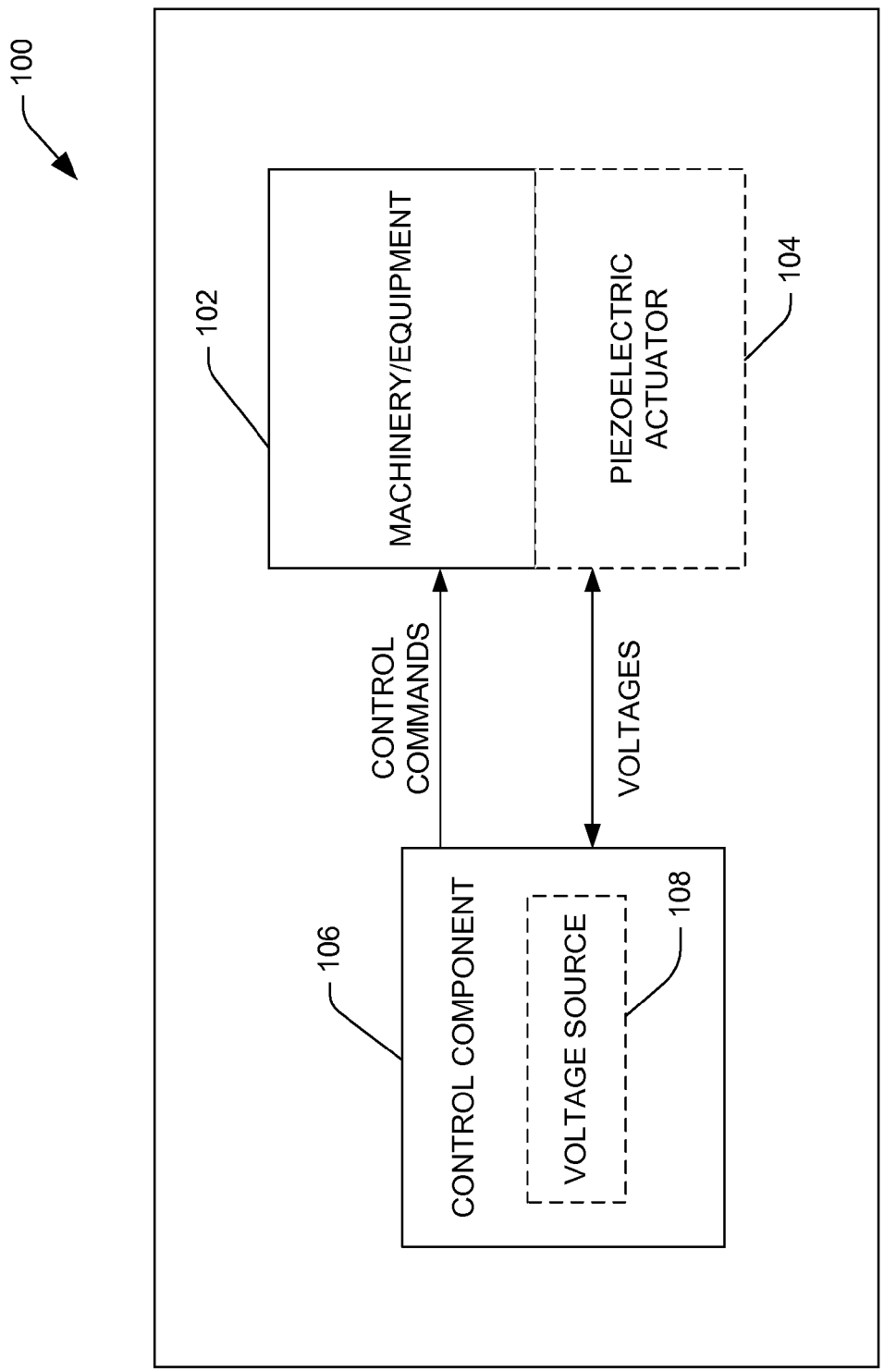
FIG. 1 is a block diagram of a mechanical vibration damping system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

It is to be appreciated that various aspects of the present invention can employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) can be employed.

Referring now to the drawings, FIG. 1 illustrates a high-level system overview in connection with one particular aspect of the subject invention. The present invention relates to a novel system 100 for mitigating mechanical vibration associated with machinery/equipment that is subject to mechanical vibration. For example, such vibration can occur upon gantry beams due to abrupt starting and/or stopping of such beam. The system 100 is especially desirable, for instance, in light of an increasing size of gantry beams. For example, as plasma televisions continue to increase in size, gantries and gantry beams will correspondingly increase in size. With this increase in size, however, there is an increase in amplitude of mechanical vibrations associated with such gantry beam during typical gantry operations. Sensitive tools positioned by gantry beams will thus be subject to substantial vibration absent the present invention. The system 100 facilitates active damping of mechanical vibration resulting from operation (e.g., starting and/or stopping) of machinery/equipment 102 via selectively applying piezoelectric actuator(s) 104 to the machinery/equipment 102. For example, the machinery/equipment 102 can be a gantry beam, a rail, a track, a conveyor, a motor or a portion thereof, a generator or a portion thereof, a chuck, a pump, housing, a platform, or any other suitable structure that is sensitive to mechanical vibrations. Active damping refers to applying a force (counter-force) in a direction opposite a current force to reduce mechanical vibration occurring upon abrupt stoppage of a device (e.g., the machinery/equipment 102). In accordance with one aspect of the present invention, one or more linear motors (not shown) can be employed to facilitate positioning of the machinery/equipment 102 (e.g., during an instance that the machinery/equipment includes a gantry beam). These motor(s) can be an iron core linear motor, such as Anorad's LC80 Linear Motor, a brushless linear servo-motor, a brushed linear motor, a linear step motor, or any other suitable industrial linear motor. Furthermore, the piezoelectric actuators 104 can be stack actuators, patch actuators, Moonie actuators, Bimorph actuators, and the like.

A control component 106 associated with a voltage source 108 can be employed to monitor stress and/or strain in the piezoelectric actuator 104 that result from movement relating to the machinery/equipment 102. For example, an abrupt stoppage of the machinery/equipment 102 will cause stress and/or strain within the piezoelectric actuator 104. Such stress and/or strain within the piezoelectric actuator 104 will correspond to a force that is acting upon the machinery/equipment 102, wherein the force can cause mechanical vibration in such machinery/equipment 102. The control component 106 can also be employed to facilitate positioning and/or operation of the machinery/equipment 102 for particular applications. For instance, the control component 106 can relay control commands to one or more drive motors regarding acceleration, velocity, desirable position, deceleration, etc of a gantry beam. The control component 106 can utilize open-loop and/or closed-loop control systems, fuzzy logic, Bayesian belief networks, etc. and the control component 106 can employ feedback as well as feed forward algorithms. Furthermore, in accordance with one aspect of the present invention, PID controllers can be utilized to facilitate effective control of positioning and movement of the machinery/equipment 102. Alternatively, the control component 106 can include a human that manually determines position and/or movement of the gantry machinery/equipment 102. Through use of the piezoelectric actuator 104, faster settling time of vibrations related to the machinery/equipment 102 can result when compared to conventional vibration damping systems and/or methodologies. This in turn allows for greater throughput of applications that require utilization of machinery such as a gantry (e.g., inspection of a planar surface, such as a plasma television screen).

The piezoelectric actuator 104 is selectively applied to the machinery/equipment, and receives voltages relayed from the voltage source 108 to facilitate damping mechanical vibration that would otherwise be resident on the machinery/equipment 102. For example, the control component 106 can determine a desirable voltage/current to deliver to the piezoelectric actuator 104, and thereafter inform the voltage source 108 of the desirable voltage/current. Piezoelectricity refers to an ability of particular materials to produce a voltage when subjected to mechanical stress and/or strain. Within piezoelectric material utilized by the piezoelectric actuator 104, positive and negative electrical charges are separated, but symmetrically distributed, thereby rendering the piezoelectric material neutral. Upon applying a stress and/or strain, the symmetry is destroyed and the charge asymmetry generates a voltage. The piezoelectric material also exhibits converse piezoelectric properties, wherein applying a voltage and/or current results in distortion of the piezoelectric material. Distortion resulting from applying a voltage and/or current can be controlled via applying appropriate voltages to particular areas of the piezoelectric actuator 104. Moreover, as the piezoelectric material can generate a voltage/current when distorted via application of stress and/or strain, the piezoelectric actuator 104 can be selectively applied to the machinery/equipment 102 to facilitate damping of mechanical vibration associated therewith. For example, a distortion can occur in the piezoelectric actuator 104 upon abruptly starting and/or stopping a gantry beam, thereby resulting in generation of voltages/currents from the piezoelectric actuator 104. Such voltages can be monitored by the control component 106, and thereafter the control component 106 can control a voltage to be delivered to the piezoelectric actuator 104 via the voltage source 108. This delivered voltage can cause the piezoelectric actuator 104 to distort and generate damping forces that effectively damp vibrations associated with the gantry beam. The aforementioned properties of the piezoelectric actuator 104 (e.g., distortion upon an application of voltage, generating voltage upon distortion, . . . ) can effectuate dynamic monitoring as well as feedback control. The piezoelectric actuator 104 can comprise any suitable piezoelectric material that exhibits sufficient distortion upon receiving a voltage, such as crystals of tourmaline, quarts, topaz, cane sugar, Rochelle salt, quartz analogue crystals (e.g., $ALPO_4$, $GaPO_4$, . . . ), ceramics with perovskite or tungsten-bronze structures (e.g., $BaTiO_3$, $KNbO_3$, $LiNbO_3$, $LiTaO_3$, $BiFeO_3$, $Na_xWO_3$, $Ba_2NaNb_5O_{15}$, $Pb_2KNb_5O_{15}$, . . . ), polymer polyvinlidene fluoride ($-CH_2-CF_2-$)n, etc.

In accordance with one aspect of the present invention, commercially available piezoelectric ceramics such as PZT, PLZT and PMN-PT can be utilized to effectively damp mechanical vibration associated with machinery/equipment 102, which may comprise a gantry beam, upon positioning and/or movement thereof. More specifically, a Nb-doped PLZT having a general formula $(Pb_{1-x}La_x)(Zr_yTi_{1-y})_{1-(x/4)}O_3$, wherein x approximately equals 0.07 and y approximately equals 0.60, can be utilized in connection with the present invention. The ceramic can be fabricated by a hot forging technique utilizing $PbO$, $TiO_2$, $ZrO_2$, and $La_2O_3$ powders as starting materials with $Nb_2O_5$ added to provide 0.5-1.5% $Nb^{5+}$ (mole % as dopant). Moreover, the ceramic can be fabricated via mixing appropriate weights of the aforementioned materials. For example, 163 units of PbO, 9 units of $La_2O_3$, 56 units of $ZrO_2$, 24 units of $TiO_2$, and 1 unit of $Nb_2O_5$ can be mixed to fabricate the aforementioned ceramic.

Such ceramic exhibits a strong dielectric-permittivity maximum at approximately 155°-160° C., above and below which the permittivity drops rapidly. The ceramic becomes a polar dialectric below about 112°-125° C., exhibiting a stable net spontaneous polarization, Pr, and a well-defined polarization hysteresis loop (P versus bipolar electric field). As compared with conventional piezoelectric ceramics, such an Nb-doped PLZT ceramic has reduced strain hysteresis with application of a unipolar electric field. In addition, breakdown strengths of these PLZT ceramics are greater than about 25 kV/cm (generally 25-30 kV/cm), well above typical operating electric field strengths that are normally used for piezoelectric actuation. Furthermore, a linear piezoelectric coefficient (d33), the maximum strain (%), and fatigue life (cycles) of the Nb-doped PLZT ceramic materials are significant advances over other piezoelectric materials.

In accordance with another aspect of the present invention, a PLZT ceramic having a general formula $(Pb_{1-x}La_x)(Zr_yTi_{1-y})_{1-(x/4)-z}M_{a+4z/a}O_3$ can be selectively applied to the machinery/equipment 102, wherein x approximately lies between 0.04 to 0.05, y approximately lies between 0.52 and 0.58, z approximately lies between 0.04 and 0.06, and M is a combination of Nb and Ta, a+ being the valence of Nb and Ta respectively. Such a ceramic is fabricated via a hot forging technique utilizing $PbO$, $TiO_2$, $ZrO_2$, and $La_2O_3$ powders as starting materials. $NbO_2$ and $Ta_2O_5$ are added to provide 2.0-3.0% $Nb^{5+}$ (mole %) as dopants. The resulting materials have an average grain size of about 3 μm, a well defined polarization hysteresis loop, reduced strain hysteresis when a unipolar electric field is applied, a breakdown strength of greater than 26 kV/cm, a linear piezoelectric strain coefficient (d33) greater than 700 pC/N, maximum strain greater than 0.15%, a coupling constant (k33) of 0.81 and a fatigue life of at least 109 cycles. Furthermore, performance of aforementioned PLZT ceramic surpasses that of other available commercial photoelectric materials. This PLZT ceramic and other ceramics can be shaped in any suitable manner. For example, the PLZT ceramics can be in the shape of a routinely fabricated disk.

A formula of one particular PLZT ceramic has lanthanum, zirconium, and tantalum in molar ratios of 4.5, 55, and 45 respectively (4.5/55/45) resulting in $(Pb_{0.955}La_{0.045})(Zr_{0.55}Ti_{0.45})_{0.93875}O_3$ with Nb and Ta dopants adding an additional 4 to 6 mole %, preferably 2.5 mole % of Nb and 2.5 mole % of Ta. Such a ceramic can be fabricated by mixing 99.069 units of PbO, 3.340 units of $La_2O_3$, 28.893 units of $ZrO_2$, 15.473 units of $TiO_2$, 1.211 units of $Nb_2O_3$, and 2.014 units of $Ta_2O_5$. The PLZT ceramic exhibits a strong dialectric-permittivity maximum at approximately 200-215° C. Nb/Ta doped PLZT becomes a polar dialectric below about 205-208° C., which is much higher than other piezoelectric materials fabricated in a substantially similar manner, while still exhibiting a stable net spontaneous polarization, Pr, and a well-defined, small polarization hysteresis loop (P versus bipolar electric field). Similar to other Nb-doped PLZT ceramics, Nb/Ta-doped ceramics of the present invention also have reduced strain hysteresis with application of a unipolar electric field. In addition, breakdown of these PLZT ceramic materials is greater than about 30 kV/cm (generally 28-32 kV/cm), comparable to typical operating electric field strengths that are normally exhibited by piezoelectric actuation of materials which can not operate at higher temperatures. Furthermore, Nb/Ta-doped PLZT ceramic materials do not show degradation in operating properties, including linear piezoelectric coefficient (d33), maximum strain (%), and fatigue life (cycles) when operated at temperatures up to about 200° C.

In accordance with another aspect of the present invention, the control component 106 can relay control commands to device(s) (e.g., drive motors such as linear motors) that are associated with the machinery/equipment 102, wherein the control commands regard positioning, velocity, acceleration and/or deceleration relating to the machinery/equipment 102. For example, a gantry beam can move along a stationary frame according to the control commands. As mechanical vibrations are generated from movement of the gantry beam, the piezoelectric actuator 104 (associated with the gantry beam) is subject to mechanical stress and/or strain due to inertia and other physical forces, thereby producing voltages corresponding to magnitude of the stress and/or strain. Such voltages can be monitored and relayed to the control component 106, which in turn can apply voltages to the piezoelectric actuator 104 via the voltage source 108 to produce a desirable distortion. A succession of distortions of the piezoelectric actuator 104 can effectuate damping of the mechanical vibrations existent on the gantry beam. For example, the system 100 can apply a counterforce with substantially similar magnitude to an inertial force, thereby facilitating damping of vibration resident on the machinery/equipment 102 (e.g., the machinery/equipment 102 can include a gantry beam). Furthermore, the system 100 can be modified according to particular application requirements to allow for a predetermined amount of mechanical vibration. The piezoelectric actuator 104 is more responsive than conventional systems and/or methods for damping mechanical vibration associated with machinery/equipment that is subject to mechanical vibration, as upon application of a voltage the piezoelectric actuator 104 quickly distorts (e.g., the piezoelectric material within the piezoelectric actuator 104 is not subject to delays associated with servo motors regarding responding to the force). Furthermore, the piezoelectric actuator 104 can generate bending forces on the order of tens of millions of pounds upon a few nanometers of distortion (a much larger amount of force than can be obtained utilizing conventional systems and/or methods). While the system 100 displays a single piezoelectric actuator 104 sensing mechanical stress and/or strain as well as being distorted to damp mechanical vibration associated with the machinery/equipment 102, it is to be understood that disparate piezoelectric actuators can be employed to sense stress and/or strain and actively damp mechanical vibrations associated with the machinery/equipment 102.

Moreover, various sensors (not shown) and learning machines (e.g., a classifier) can be employed in connection with the present invention to facilitate rapid damping of mechanical vibration typically associated with the machinery/equipment 102 (e.g., especially during instances that the machinery/equipment 102 includes a gantry beam with substantial length). For example, an accelerometer, velocity sensor, and/or positioning sensor can be utilized in connection with the piezoelectric actuator 104 and the control component 106 to accurately predict an amount of voltage to apply to the piezoelectric actuator 104 for rapid damping of mechanical vibration associated with the machinery/equipment 102. A classifier (not shown) can be utilized to watch the machinery/equipment 102 over time in connection with particular operator(s) and/or applications to learn typical operation. Furthermore, such classifier can be used to facilitate prediction of necessary counterforce to be applied via the piezoelectric actuator 104 upon application changes and/or degradation of performance of a gantry.

In accordance with another aspect of the present invention, a plurality of piezoelectric actuators 104 can be provided and selectively applied to the machinery/equipment 102, thus allowing the piezoelectric actuator 104 to distort in disparate directions to effectively damp vibration associated with the machinery/equipment 102. These distortions in turn can generate forces in disparate directions to damp mechanical vibration associated with the machinery/equipment 102. For example, the machinery/equipment can include a gantry beam that is employed to allow movement of a tool over a plane (e.g., moving an optical scanning component over a plasma screen). Alternatively, the gantry can facilitate transfer and positioning of a tool in 3-dimensions. Upon stoppage of the gantry beam, vibration occurs in such beam due to inertia and inherent flexibility of the gantry beam. Furthermore, as length of the gantry beam increases, magnitude of vibration on the gantry beam likewise increases. Such vibration is extremely detrimental to sensitive applications, such as optical scanning of large flat-panel screens. A plurality of piezoelectric actuators 104 can be selectively applied to the gantry beam, and thereafter distorted via receiving appropriate voltages from the voltage source 108 to assert force(s) that effectively damp mechanical vibrations on the gantry beam in three dimensions. While the previous example utilized a gantry beam to illustrate one or more benefits of the present invention, it is understood that the present invention can be employed to actively damp mechanical vibrations associated with any suitable machinery/equipment that is subject to mechanical vibrations.

Figure 2:
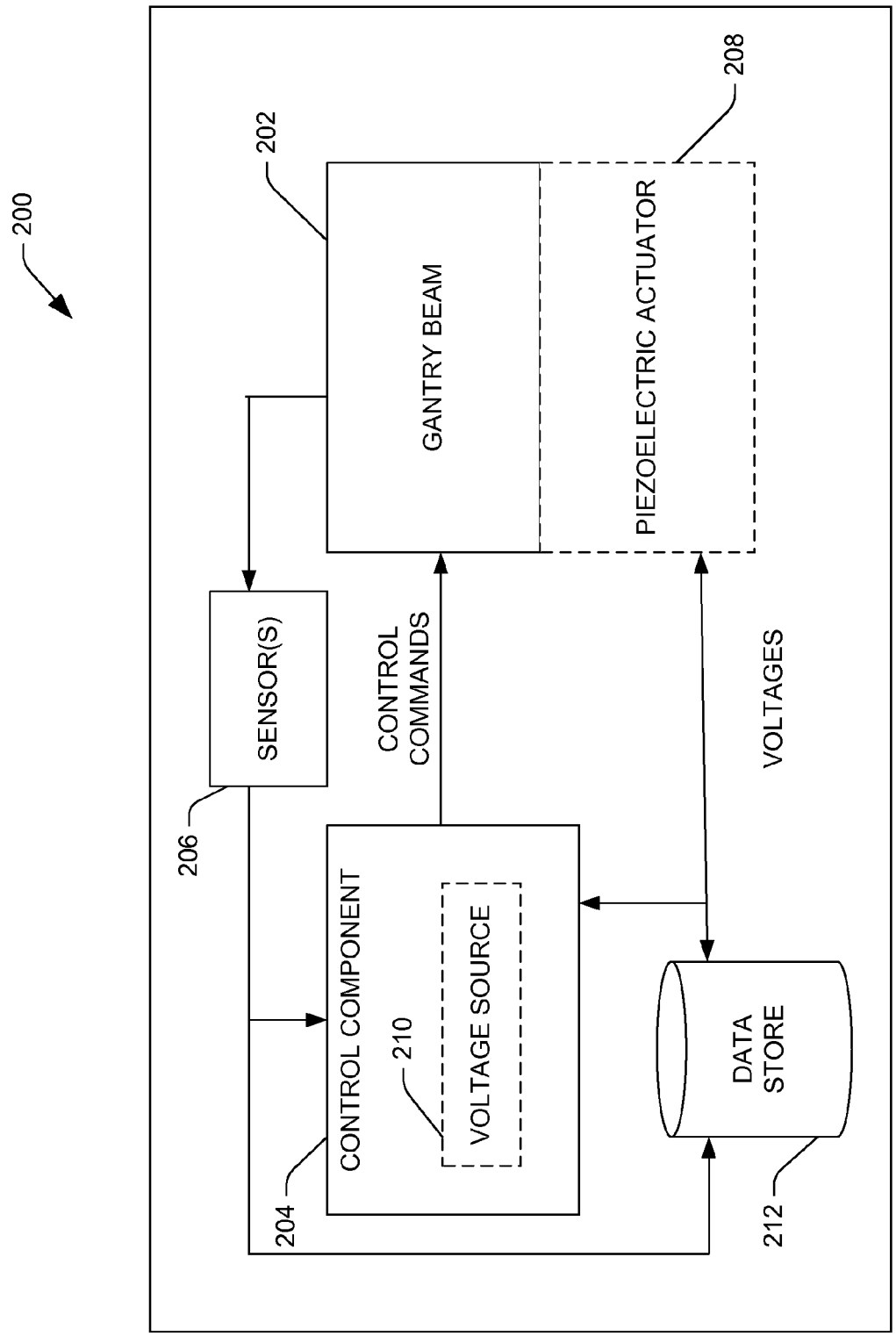
FIG. 2 is a block diagram of a mechanical vibration damping system in accordance with an aspect of the present invention.

Turning now to FIG. 2, an exemplary system 200 facilitating damping of mechanical vibration associated with a gantry beam 202 is illustrated. While the system 200 is shown as comprising the gantry beam 202 and damping mechanical vibration associated therewith, it is to be understood that various machinery can employ one or more aspects of the present invention in connection with actively damping mechanical vibrations. For example, mechanical vibrations can be problematic with respect to a single axis stage with one or more moveable elements, as well as a coplanar stage with one or more moveable elements. Therefore, the present invention is not limited to gantries, but one or more aspects of such invention can be employed in connection with damping mechanical vibrations resident upon any suitable machinery. The gantry beam 202 is responsive to control commands delivered by a control component 204 (e.g., starting, stopping, accelerating, decelerating, . . . ). For example, drive motor(s) (not shown) can receive the control commands and move/position the gantry beam 102 accordingly. One or more sensors 206 can be provided to determine position, acceleration, deceleration, velocity, temperature, etc. of the gantry beam 202 and loads associated therewith (e.g., a tool). The sensors 206 can relay the sensed information to the control component 204 as feedback or feed forward information.

At least one piezoelectric actuator 208 can be selectively applied to the gantry beam 202 to effectuate damping of mechanical vibrations associated therewith. More particularly, as the gantry beam 202 accelerates, decelerates, starts and/or stops, stress and/or strain applied to the piezoelectric actuator 208 creates voltages upon such actuator 208 corresponding to magnitude of the stress and/or strain. The control component 204 can be associated with a voltage source 210, which can direct a voltage to distort the piezoelectric actuator 208, thereby generating a distortion in the piezoelectric actuator 208 that effectuates damping mechanical vibrations on the gantry beam 202. The voltage can be generated based on information monitored by the sensor(s) 206 and/or voltage created via stress upon the piezoelectric actuator 208. Rapid damping of mechanical vibration is therefore provided by the system 200.

A data store 212 can be provided to retain information monitored by the sensor(s) 206, voltages relayed to and/or from the piezoelectric actuator 208, and corresponding control commands relayed from the control component 204. Such information can be formatted in data tables of a plurality of dimensions and accessed by the control component 204. More efficient control of a gantry (not shown) and the piezoelectric actuator 208 can occur, as the control component 204 can quickly access the data tables within the data store 212 to determine appropriate actions under particular circumstances. For example, the data table can include appropriate control commands as well as voltage levels associated with particular positions and decelerations. When the sensor(s) 206 relay position and deceleration of the gantry beam 202 to the control component 204, the control component 204 can access the data store 212 and parse the data table to retrieve appropriate control commands and voltages to deliver to the piezoelectric actuator 208, thereby facilitating improved damping of mechanical vibration associated with the gantry beam 202.

It is further to be appreciated that the data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store of the present systems and methods is intended to comprise, without being limited to, these and any other suitable types of memory. While the system 200 of FIG. 2 is shown to employ the gantry beam 202, it is understood that the beam could be replaced by any suitable machinery/equipment wherein damping of mechanical vibration associated therewith is desirable. For example, the present invention can facilitate active damping of mechanical vibration associated with a motor, generator, housing, track, rail, conveyor, platform, chuck, pump, or any other suitable mechanical device subject to vibration.

Figure 3:
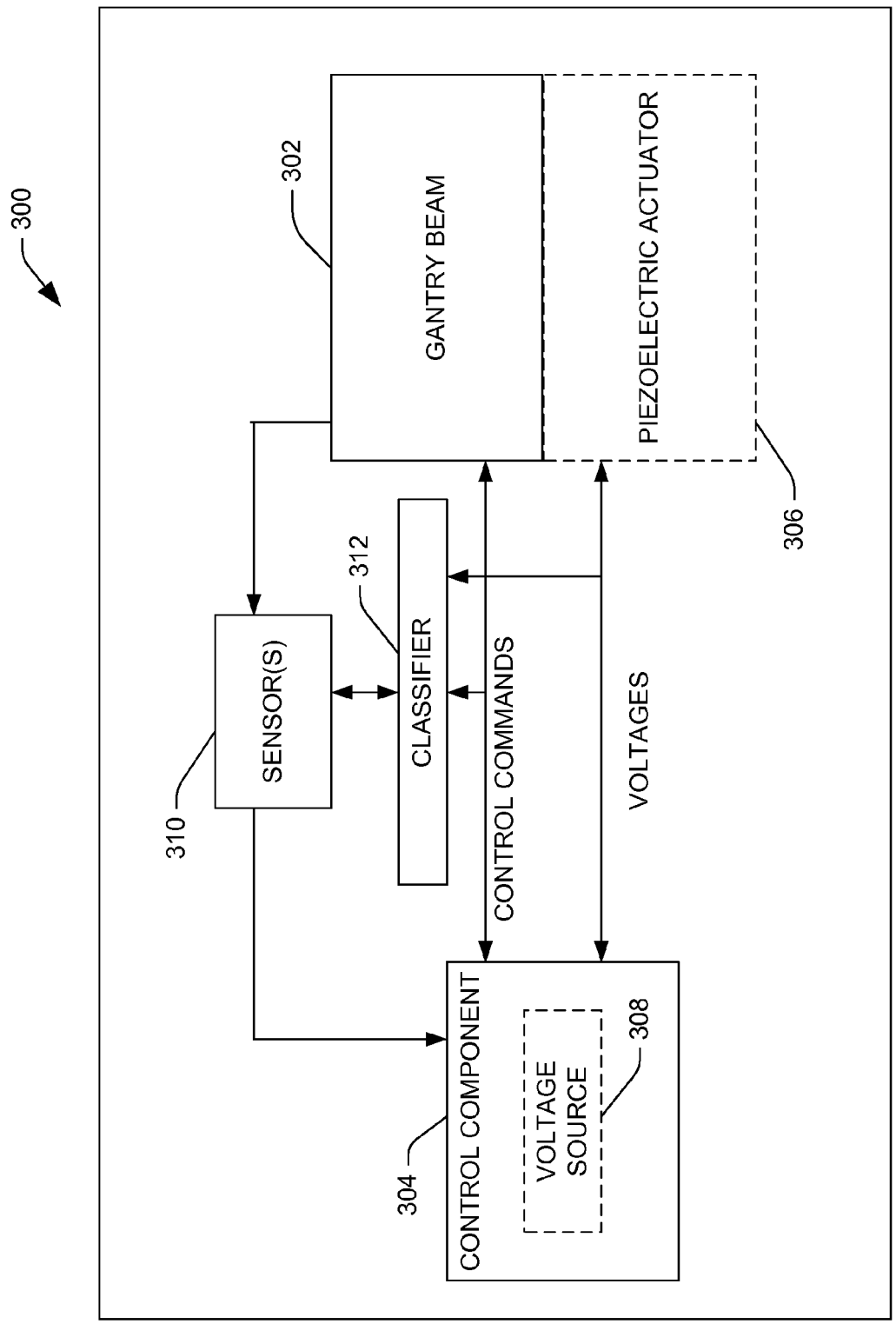
FIG. 3 is a block diagram of a mechanical vibration damping system in accordance with an aspect of the present invention.

Referring now to FIG. 3, a system 300 that facilitates damping of mechanical vibration associated with a gantry beam 302 upon accelerating, decelerating, stopping and/or starting such beam 302 is illustrated. The gantry beam 302 is responsive to control commands relayed from a control component 304, wherein the control commands are employed by driving mechanism(s) (e.g., one or more linear motor(s)) to desirably position and move the gantry beam 302. At least one piezoelectric actuator 306 is selectively applied to the gantry beam 302, and receives voltages from a voltage source 308 that operates in connection with the control component 304. The piezoelectric actuator 306 generates a voltage based upon the stress and/or strain of the piezoelectric actuator 306 during acceleration, deceleration, starting and stopping of the gantry beam 302. The voltages can be received by the control component 304 and utilized to determine an appropriate amount of distortion to generate with respect to the piezoelectric actuator 306. The voltage source 308 relays voltage(s) to distort the piezoelectric actuator 306 to effectuate damping of mechanical vibrations upon the gantry beam 302.

One or more sensor(s) 310 can be employed to monitor various parameters of the gantry beam 302, such as velocity, position, acceleration, etc., wherein the monitored parameters can be utilized in association with feedback or feed forward control systems. A classifier 312 can also be provided to utilize information monitored by the sensor(s) 310, as well as control commands and corresponding voltages delivered to the driving mechanism(s) of the gantry beam 302 and the piezoelectric actuator 306, respectively, to enable robust control of the system and mitigate overshoot. The classifier 312 can watch the system 300 to "learn" operability of the system 300 over a period of time, and thus infer appropriate voltages to apply to the piezoelectric actuator 306 given particular sensed parameters of the gantry beam 302. The classifier 312 can thereafter function in connection with the control component 304 to control a gantry without sensor delay (e.g., the classifier 312 can predict operation of a gantry and relay such prediction to the control component 304, thus mitigating delay inherent in the sensor(s) 310).

Figure 4:
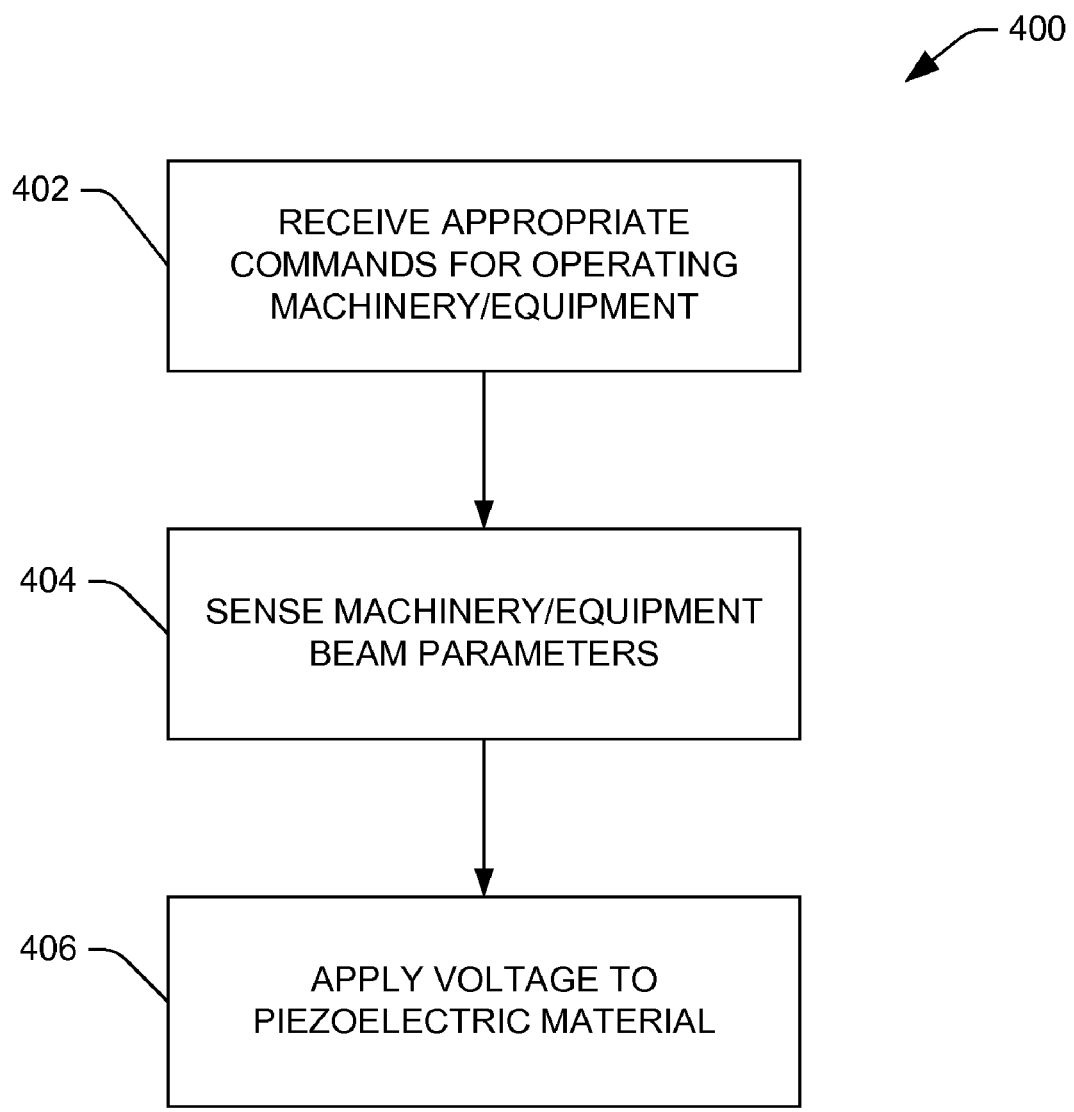
FIG. 4 is a block diagram of a mechanical vibration damping system in accordance with an aspect of the present invention.

Turning now to FIG. 4, a methodology 400 for damping mechanical vibration associated with various machinery/equipment is illustrated. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 402, commands for operating machinery/equipment (such as a gantry) are received. In accordance with one aspect of the present invention, the commands can originate manually from a user (e.g., the user can directly operate the machinery/equipment via levers, push buttons, emergency stoppage switches, . . . ). For example, a user can manually position an optical viewing mechanism attached to a gantry beam via commanding the gantry. Alternatively, a computing component can relay pre-defined commands applicable to govern actions of other machinery/equipment. In accordance with another aspect of the present invention, upon sensing certain acceleration, position, velocity, etc., a data table can be parsed to obtain commands appropriate for a current operating status. Moreover, a control component can be utilized to generate the commands based upon current sensed parameters related to the machinery/equipment (e.g., position, acceleration, velocity, desired stopping position, . . . ). The control component can utilize open and/or closed loop control systems, PID controllers, feedback and/or feed forward algorithms, artificial intelligence techniques, etc. The machinery/equipment operates desirably as it is responsive to the commands.

At 404, parameters regarding a current state of machinery/equipment are sensed. For example, accelerometers can be utilized to determine a present acceleration of at least a portion of the machinery/equipment. Various sensors can be employed to determine a plurality of other parameters, such as velocity, position, temperature, etc. Furthermore, one or more sensors can be employed to monitor inertial force occurring with relation to a piece of machinery/equipment such as a gantry beam upon stoppage. For example, piezoelectric actuators can be selectively applied to the gantry beam, wherein force applied to the piezoelectric actuator at a particular location results in emitted voltage that identifies magnitude and direction of current force (e.g., force due to inertia upon stoppage of the linear motor(s)). The voltage can be monitored to determine a magnitude and direction of distortion desired of the piezoelectric actuator to quickly dampen mechanical vibrations upon the gantry beam.

At 406 an appropriate amount of voltage is applied to the piezoelectric actuators to effectuate desirable damping of mechanical vibration associated with the machinery/equipment. Voltages of appropriate magnitude applied at particular locations of the piezoelectric actuators can result in distortion of the piezoelectric actuators in a desirable direction (e.g., opposite inertial force direction), and thereby generate a damping force to quickly damp the mechanical vibration. For example, inertial forces will cause mechanical vibration to occur on a gantry beam that abruptly stops. Voltages can be applied to the piezoelectric actuators that were selectively applied to the machinery/equipment to damp the mechanical vibration associated with such machinery/equipment.

Figure 5:
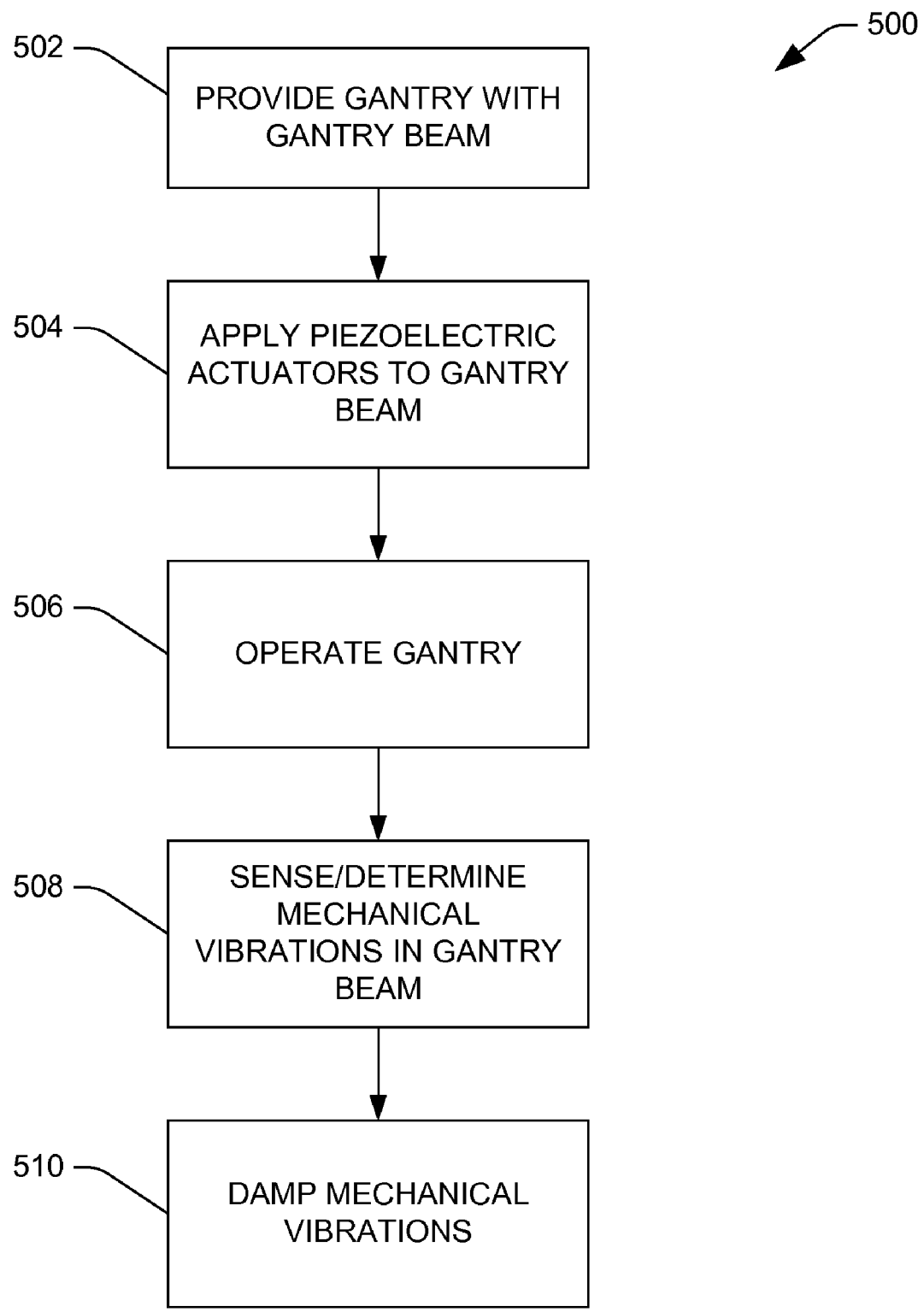
FIG. 5 is a representative flow diagram illustrating a methodology for damping mechanical vibration associated with machinery in accordance with an aspect of the present invention.
Figure 6:
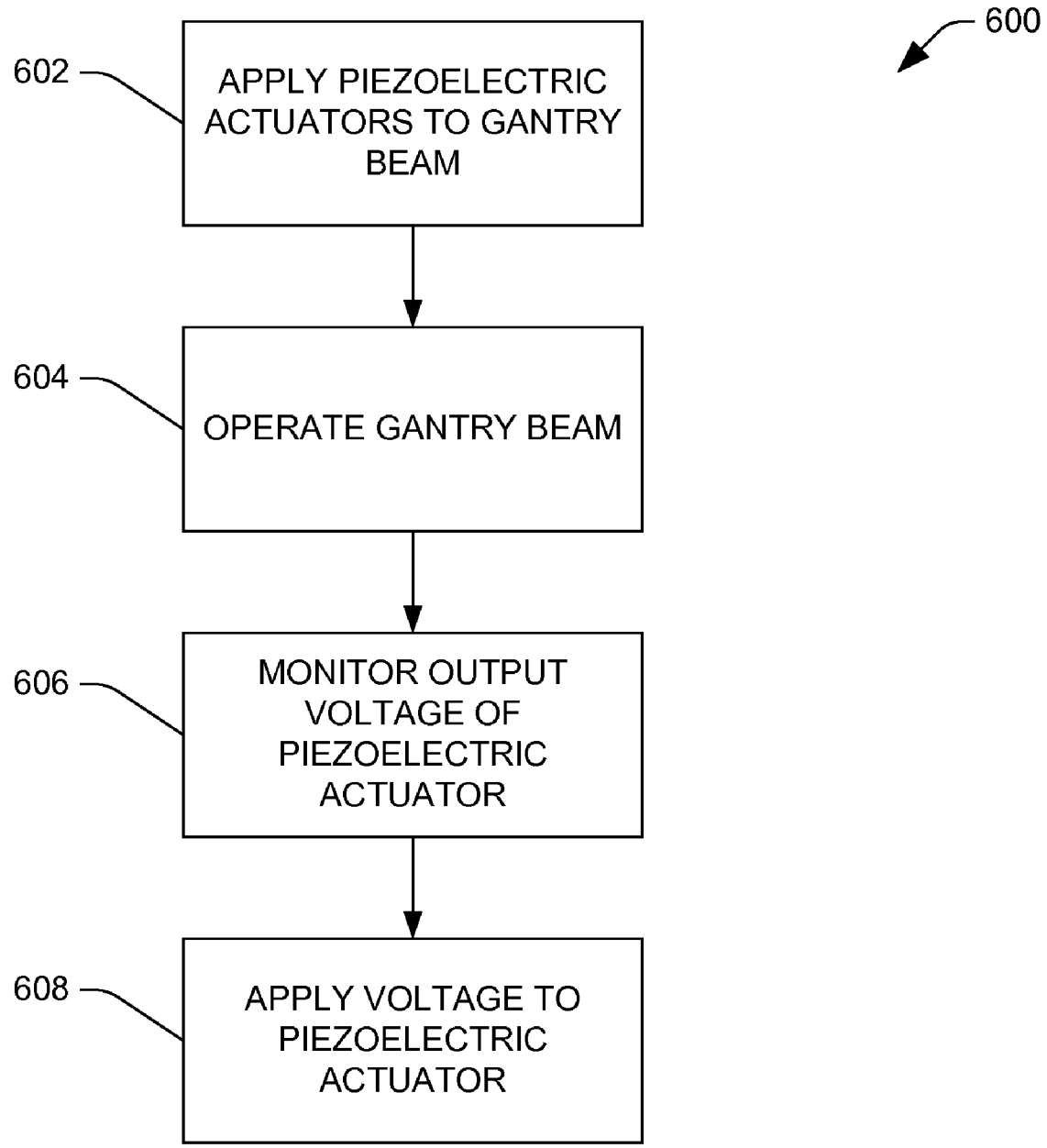
FIG. 6 is a representative flow diagram illustrating an exemplary methodology for damping mechanical vibration associated with a gantry in accordance with an aspect of the present invention.

Regarding FIGS. 5 and 6, methodologies for actively damping mechanical vibrations associated with a gantry beam are illustrated. It is to be understood, however, that one or more aspects of the presented methodologies can be applied to any suitable machinery/equipment that is subject to mechanical vibration. Now referring solely to FIG. 5, a flow diagram 500 illustrating a methodology for damping mechanical vibration in a gantry beam is illustrated. At 502 a gantry comprising a gantry beam is provided. As particular applications have required gantry beams to become greater in length, mechanical vibrations on such beams have become problematic. For example, screen sizes of commercially available plasma screen televisions have become quite large (e.g., in excess of 60 inches). Gantries (and gantry beams) are employed to precisely position a tool over such screens to monitor surface quality, wherein excessive vibration of the tool can compromise integrity of a monitoring application, increase time required to complete the application, as well as cause damage to the monitoring tool. Accordingly, it is desirable to effectively damp mechanical vibration within gantry beams.

At 504, piezoelectric actuators are selectively applied to the gantry beam. Empirical data, size of the gantry beam and material of the gantry beam, type of piezoelectric actuator, application, and other similar factors can be accounted for when determining a number of piezoelectric actuators to apply to the gantry beam, as well as when determining position of the piezoelectric actuators on the gantry beam. In accordance with one aspect of the present invention, the piezoelectric actuators can include a Nb-doped PLZT having a general formula $(Pb1-xLax)(ZryTi1-y)1-(x/4)O3$, wherein x approximately equals 0.07 and y approximately equals 0.60. In accordance with another aspect of the present invention, a PLZT ceramic having a general formula $(Pb1-xLax)(ZryTi1-y)1-(x/4)-zMa+z/aO3$ can be selectively applied to the gantry beam 102, wherein x approximately lies between 0.04 to 0.05, y approximately lies between 0.52 and 0.58, z approximately lies between 0.04 and 0.06, and M is a combination of Nb and Ta, a+ being the valence of Nb and Ta respectively. Another exemplary PLZT ceramic has lanthanum, zirconium, and tantalum in molar ratios of 4.5, 55, and 45 respectively (4.5/55/45) resulting in $(Pb0.955La0.045)(Zr0.55Ti0.45)0.93875O3$ with Nb and Ta dopants adding an additional 4 to 6 mole %, preferably 2.5 mole % of Nb and 2.5 mole % of Ta. While the aforementioned piezoelectric ceramics can be employed in the methodology 500, it is to be understood that any piezoelectric material that exhibits sufficient piezoelectric properties (e.g., sufficient displacement/force at particular voltages) can be employed.

At 506, the gantry is operated. The gantry can be operated automatically based upon a pre-determined program, manually by a user, or a combination thereof. In typical gantry operation, the gantry beam will be moving a tool over a planar surface. It is to be understood, however, that the gantry can be employed to position a tool in three dimensions (e.g., the gantry beam can be moveable in three dimensions). At 508, mechanical vibration in the gantry beam is sensed. In accordance with one aspect of the present invention, the piezoelectric actuators and/or other piezoelectric devices can be employed to sense mechanical vibration in the gantry beam. For instance, piezoelectric devices output voltages when such devices are subject to stress and/or strain. Therefore, output voltages of the piezoelectric devices can be monitored to determine an amount of stress and/or strain. These stress and/or strain measurements can thereafter be employed to determine an amount of mechanical vibration occurring on the gantry beam. Furthermore, various other sensors can be utilized to sense/determine an amount of mechanical resonance in the gantry beam. For example, sensors that can determine position, acceleration, deceleration, velocity, etc. can be selectively applied to disparate positions on the gantry beam. Thereafter sensor fusion components can be employed to determine mechanical vibration associated with the gantry beam.

At 510 the sensed mechanical vibration is damped via applying appropriate voltages to the piezoelectric actuators that were previously applied to the gantry beam. Applying voltages to the piezoelectric actuators results in distortion of such actuators. These distortions are associated with a high degree of force (much higher than conventional actuators). For example, on a forty inch gantry beam, resonant displacement capability of approximately 300 micro inches with an electric field of approximately 5 kV/cm applied to the piezoelectric actuators was accomplished. Therefore, distortions opposite a direction of force during mechanical vibrations can be generated to effectively damp such mechanical vibrations.

Now referring to FIG. 6, a methodology for damping mechanical vibrations associated with a gantry beam is illustrated. At 602, piezoelectric actuators are selectively applied to a gantry beam. In accordance with one aspect of the present invention, the piezoelectric actuators can include a ceramic PLZT. It is to be understood, however, that any piezoelectric actuator with sufficient piezoelectric properties can be applied to the gantry beam. At 604, the gantry beam is operated according to a particular application. Such operation can include abrupt stopping and/or starting, reversal of direction, or other movement that can cause mechanical vibration to occur within the gantry beam. At 606, voltage output by the piezoelectric actuators is monitored. During operation of the gantry, the piezoelectric actuators will be subject to stress and/or strain, which results in generation of a voltage according to such stress and/or strain. Thus, voltages output by the piezoelectric actuators can be monitored and utilized to determine an amount of mechanical vibration on the gantry beam.

At 608, voltage is applied to the piezoelectric actuators based at least in part upon voltages output by the piezoelectric actuators. For example, sensed voltages output by the piezoelectric actuators can indicate a certain degree of mechanical vibration within the gantry beam. A control component can monitor the sensed voltages, and thereafter selectively apply voltages to the piezoelectric actuators to cause a particular degree of distortion in such actuators. That distortion can cause displacement in the gantry beam, which can effectively damp the mechanical vibration associated therewith. Furthermore, it is to be understood that disparate piezoelectric actuators can be employed for sensing stress and/or strain and distorting to damp mechanical vibration. For example, a first set of piezoelectric actuators can be utilized to monitor stress and/or strain occurring thereon, and a second set of piezoelectric actuators can be employed to receive voltages to damp mechanical vibrations calculated from the monitored stress and/or strain.

Figure 7:
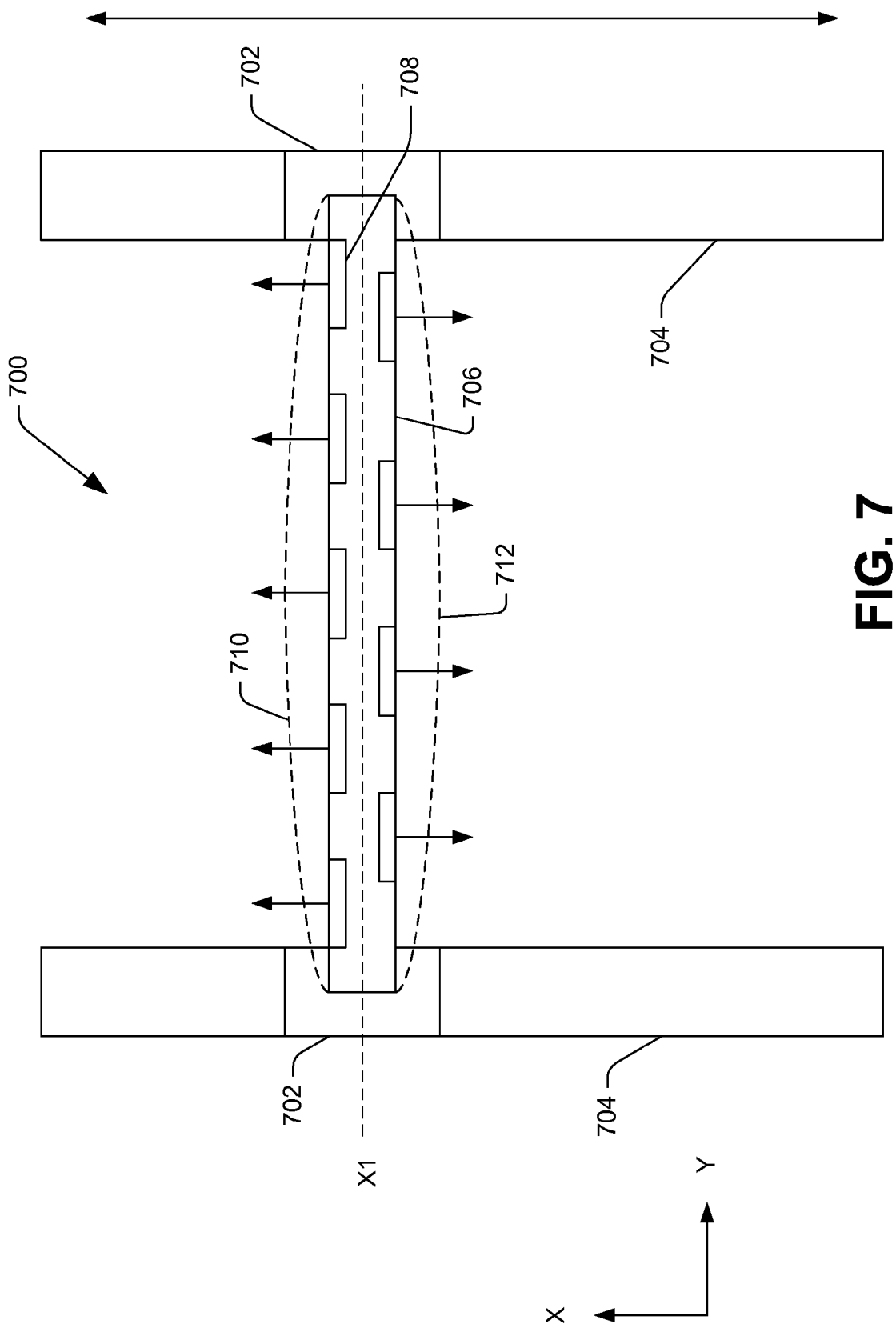
FIG. 7 is an exemplary gantry that can be employed in connection with the present invention.

Turning now to FIG. 7, an exemplary gantry 700 in accordance with one aspect of the present invention is illustrated. The gantry 700 includes a pair of linear motors 702 moveable in the X-direction to a desirable position along a track 704. The linear motor 702 can be a moving element, and the track 704 can be a stator element comprising a plurality of magnets (not shown). In such an embodiment, a combination of the linear motor 702 and the track 704 can itself be a linear motor. The pair of linear motors 702 transports a gantry beam 706 to a desired position. The beam 706 has a plurality of piezoelectric actuators 708 applied thereto. While the plurality of piezoelectric actuators 708 are displayed separately on opposite sides of the beam 706, it is understood that any arrangement of piezoelectric actuators 708 operable to apply a force to damp mechanical vibration associated with the gantry beam 706 is contemplated by the subject invention. For example, difference in beam shape and application can required disparate positioning of the piezoelectric actuators to effectively damp mechanical vibrations associated with the gantry beam 706.

In accordance with one aspect of the present invention, the linear motors 702 previously traveling in the positive X-direction are desirably stopped to position the center of the gantry beam 706 at X1. Upon stopping, the gantry beam 706 is subject to mechanical vibration with a maximum magnitude illustrated by dashed lines 710 and 712. A substantial amount of mechanical vibration can exist on the gantry beam 706 due to forces of inertia, mass of the gantry beam 706, length of the gantry beam 706, inherent flexibility of the gantry beam 706, etc. The plurality of piezoelectric actuators 708 are selectively applied to the gantry beam 706 to provide a damping of mechanical vibration of the gantry beam upon stress and/or strain sensed by the piezoelectric actuators 708. The piezoelectric actuators 708 can be appropriately sized and positioned to allow for distortion that will quickly damp mechanical vibrations resident on the gantry beam 706. (e.g., arrows indicate direction that the piezoelectric actuators 708 typically are distorted). While the mechanical vibration of the gantry beam 706 is illustrated in one dimension (an X-dimension), it is known that mechanical vibrations can exist in three dimensions. It is to be understood that the piezoelectric actuators 708 that are selectively applied to the gantry beam 706 can facilitate damping of the mechanical vibrations simultaneously in such three dimensions. For example, the piezoelectric actuators 708 can be applied to the gantry beam in such a manner to facilitate sensing of stress and/or strain in three dimensions, and be employed to distort to counteract such strain (e.g., to suppress mechanical vibrations in one or more dimensions).

Figure 8:
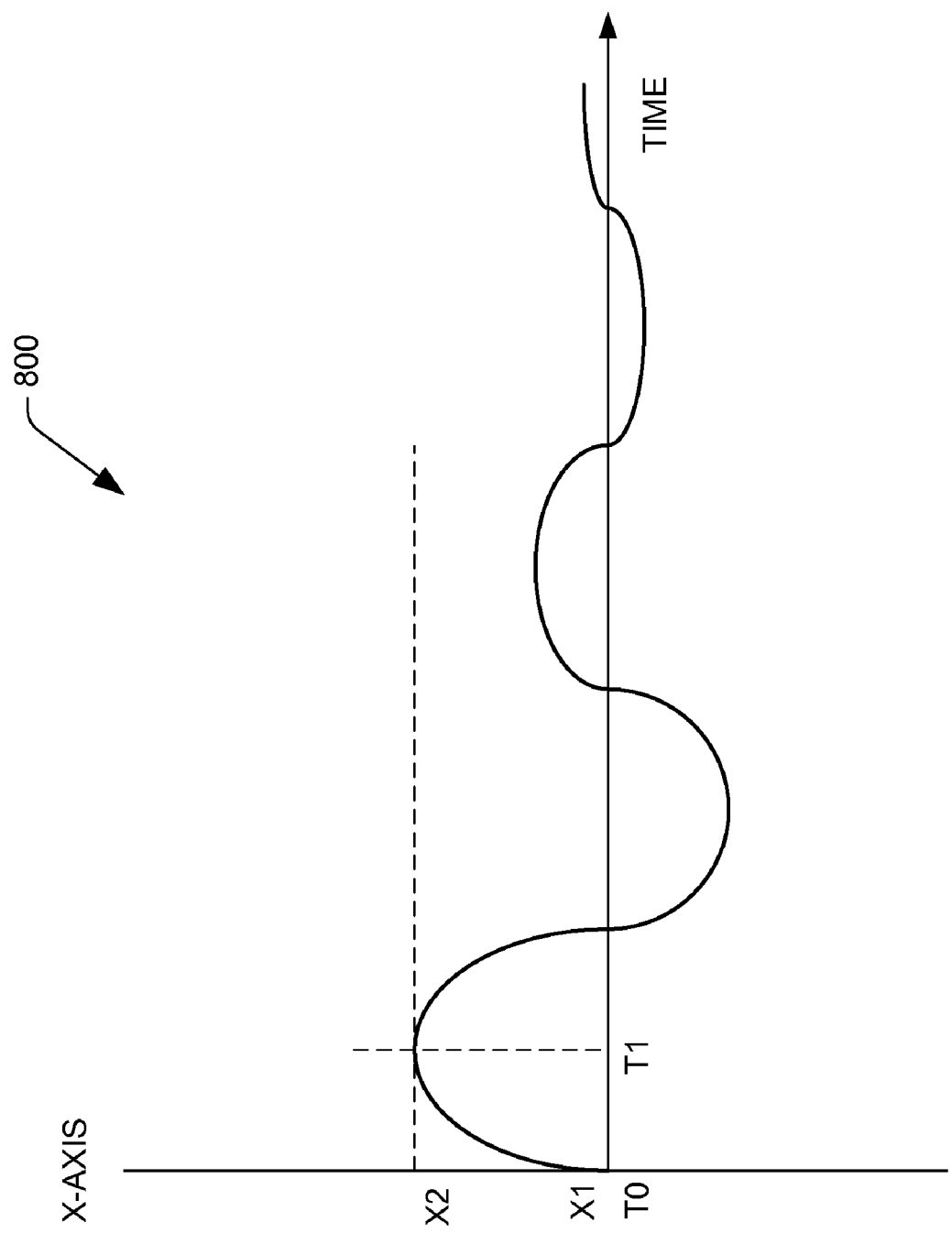
FIG. 8 is a graph illustrating mechanical vibration associated with abruptly starting and/or stopping a gantry accordance with an aspect of the present invention.

Turning briefly to FIG. 8, an exemplary graph 800 of mechanical vibration associated with one particular location upon the gantry beam 706 (FIG. 7) is illustrated. At time T0, movement of the gantry beam 706 is abruptly halted at a desirable position X1. Mechanical vibration results from inertial forces, wherein a maximum magnitude of vibration occurs at time T1 and position X2. As time passes, the mechanical vibration continues while decreasing in magnitude. Applications employing gantries, however, would allow for greater throughput if settling time were reduced. For example, without an adequate damping mechanism, applications utilizing the gantry beam 706 can be forced to remain idle until magnitude of the vibration decreases to a threshold. Furthermore, it would be desirable to substantially suppress vibration within the gantry beam 706. During sensitive applications, substantial vibration within the gantry beam 706 can cause application inefficiency, damage to a load (e.g., a video monitoring device), compromise quality of the application, etc.

Figure 9:
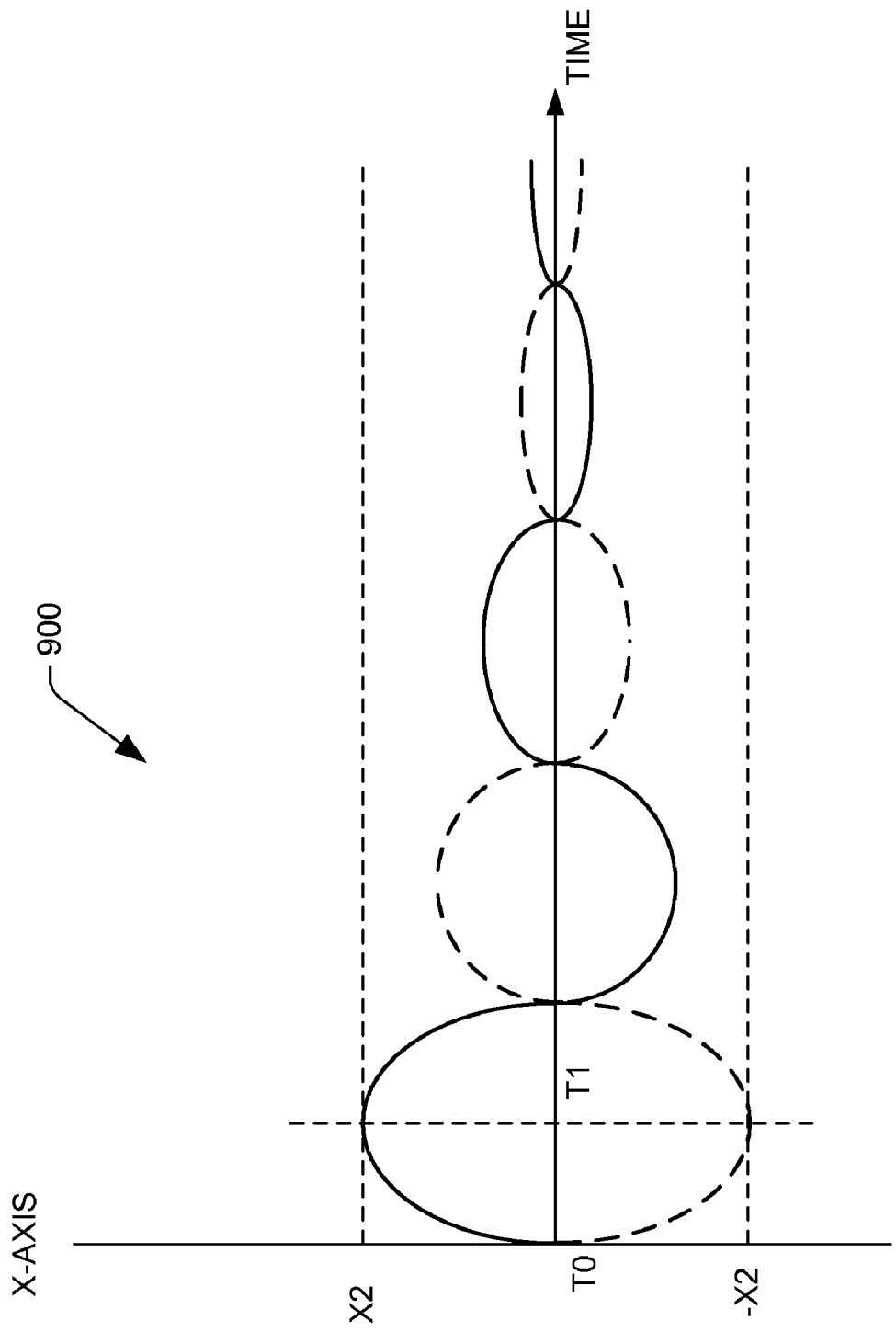
FIG. 9 is a graph illustrating a counterforce that damps mechanical vibration associated with a gantry in accordance with an aspect of the present invention.

Now regarding FIG. 9, an exemplary graph 900 illustrating force applied via the piezoelectric actuators 708 (FIG. 7) to offset mechanical vibration associated with the gantry beam 706 is displayed. At time T0, the gantry beam 706 has abruptly stopped, and inertial forces with maximum magnitude of X2 result. In accordance with one aspect of the present invention, the piezoelectric actuators 708 can be distorted to substantially offset the mechanical vibration via applying a counterforce of substantially similar magnitude at approximately the same time the mechanical vibration occurs. For example, at time T1 when inertial forces causing vibration are at a magnitude X2, the piezoelectric actuators 708 can be distorted to provide a counterforce at approximately time T1 of magnitude −X2. Sensor(s), classifier(s), data table(s), and the piezoelectric actuators 708, alone or in conjunction, can facilitate distorting the piezoelectric actuators 708 to provide a counterforce of appropriate magnitude at an appropriate time.

Figure 10:
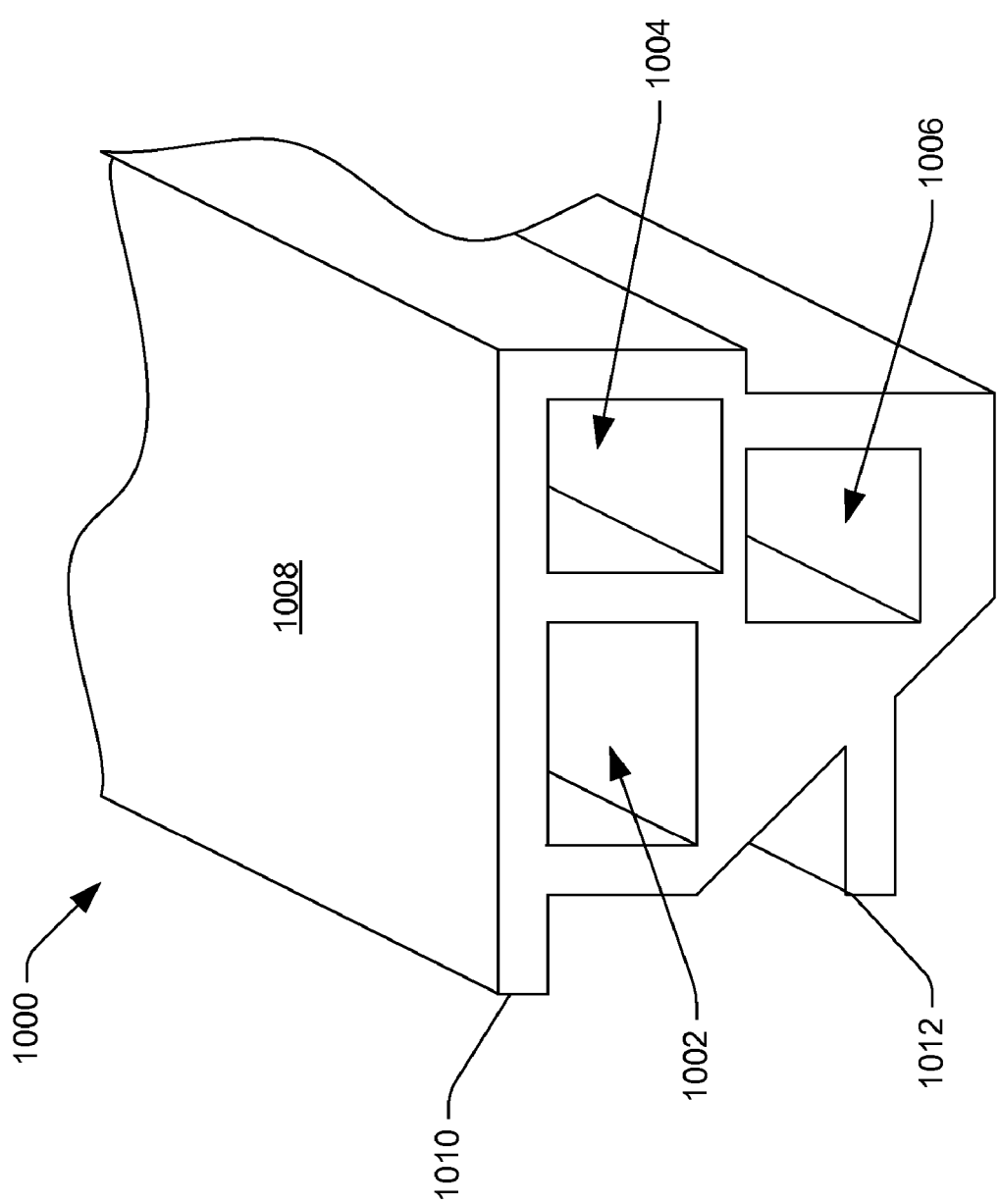
FIG. 10 illustrates another exemplary gantry that can be employed in accordance with an aspect of the present invention.

Turning now to FIG. 10, a portion of an exemplary gantry beam 1000 that is subject to mechanical vibration is illustrated. For example, gantry beams similar to the gantry beam 1000 can have a length between 40 and 100 inches, and a weight between 50 and 150 pounds. Such length and weight figures are merely exemplary, and not meant to limit the scope of the hereto appended claims. Typical gantry beams are subject to carrying loads of between 15 and 80 pounds, and often such loads are sensitive to mechanical vibrations. For instance, a tool associated with the gantry beam 1000 can be employed for monitoring a plasma screen television. In accordance with one aspect of the present invention, piezoelectric actuators (not shown) can be positioned upon the gantry beam 1000 according to particular application(s). For example, piezoelectric actuators can be placed within apertures 1002, 1004, and/or 1006 to facilitate damping of mechanical resonance associated with the gantry beam 1000. Furthermore, piezoelectric actuators can be positioned on a surface 1008 of the gantry beam 1000, near an extension 1010 and 1012 of the gantry beam, or any other position on the gantry beam 1000 that would facilitate damping mechanical vibrations associated with such gantry beam 1000.

Figure 11:
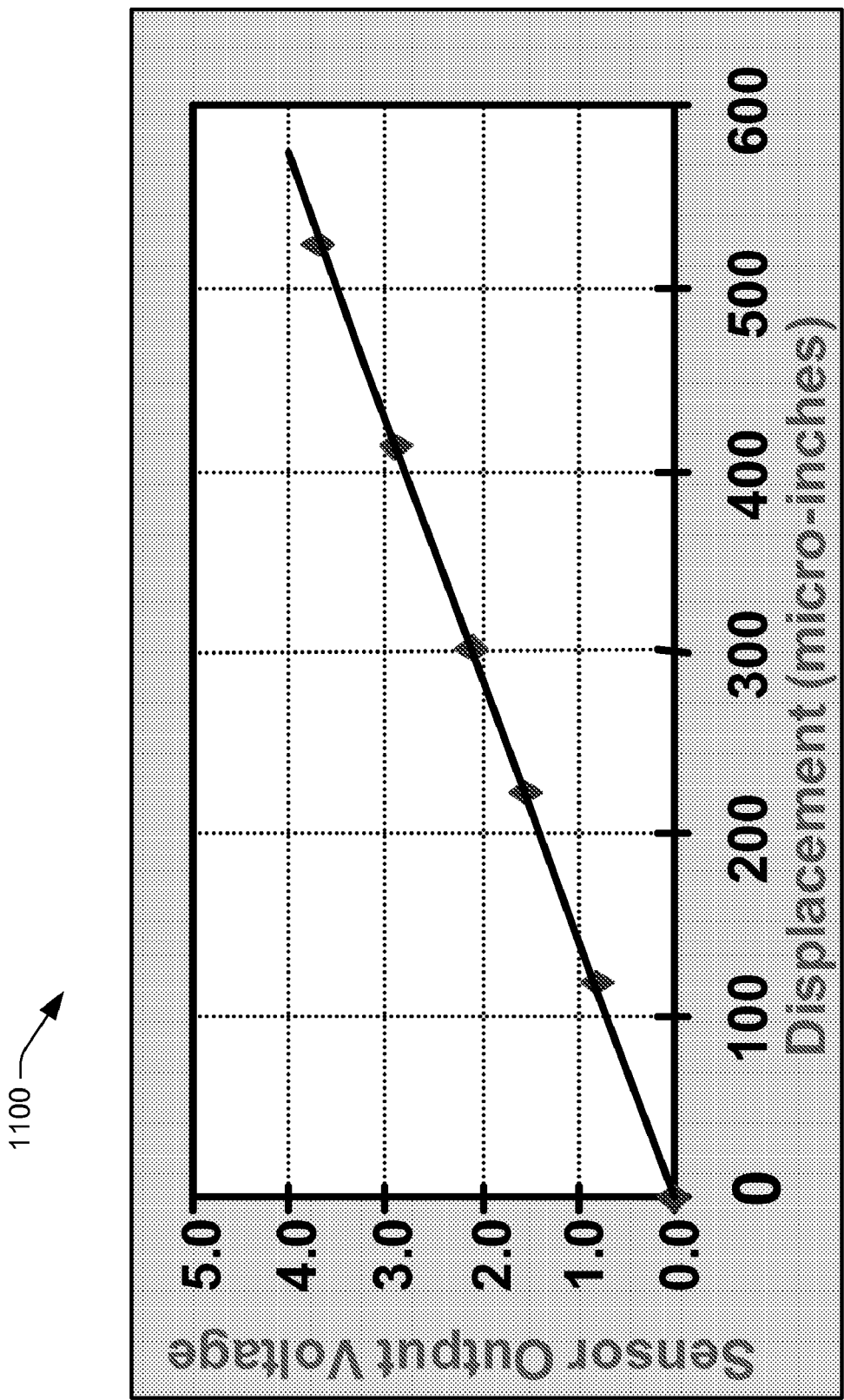
FIG. 11 is a graph that illustrates one or more benefits of a particular piezoelectric actuator that can be employed in connection with the present invention.

Now referring to FIG. 11, a graph 1100 showing output of sensors that can be employed in connection with the present invention is illustrated. The sensors utilized to obtain data illustrated in the graph 1100 were PLZT ceramic plates 0.15 centimeters in thickness that were position on the center of a forty-inch gantry beam. The gantry beam was displaced, and the voltages output by the center were monitored. As shown by the graph 1100, an approximately linear relationship exists between voltage output by the sensors and displacement of the beam. Furthermore, outputs of the sensors are virtually noise free, ensuring accurate calculation of displacement of a portion of the gantry beam. Moreover, plates of disparate thickness can be easily employed, as sensor output voltage is directly proportional to the thickness of the PLZT ceramic plates.

Figure 12:
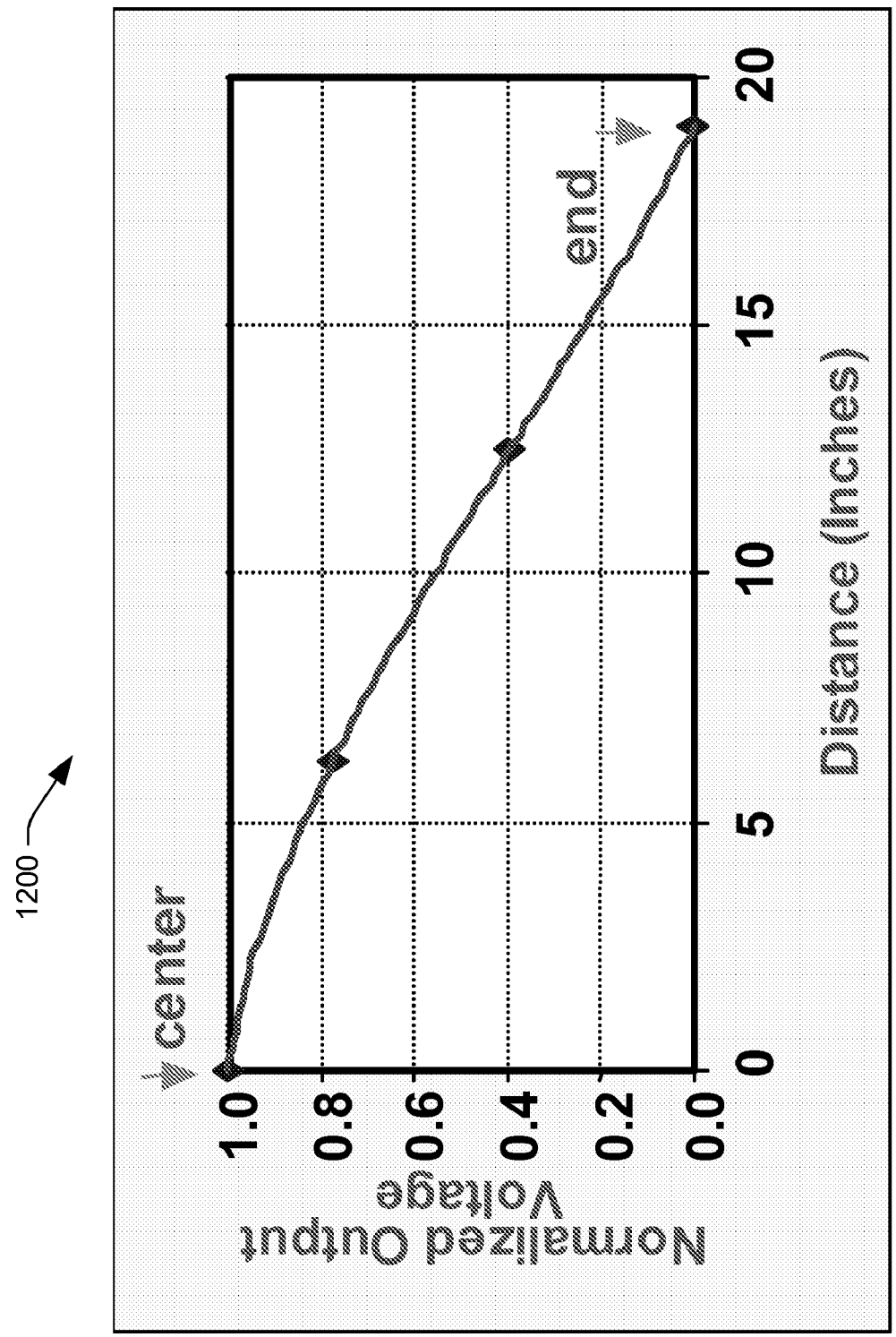
FIG. 12 is a graph that illustrates one or more benefits of a particular piezoelectric actuator that can be employed in connection with the present invention.

Turning briefly to FIG. 12, a graph 1200 that shows a relationship between voltages output by the sensors and position of the sensors on a gantry beam is illustrated. The gantry beam utilized to obtain data for the graph 1200 was forty inches in length. The sensors employed in connection with obtaining data utilized to generate the graph 1200 were PLZT ceramic plates with 0.15 centimeters in thickness. These sensors were placed in an array along the length of the gantry beam. Thus, it can be determine from reviewing the graph 1200 that the sensor array covered approximately 38 inches of the beam. The output voltages are greatest at the center of the beam where displacement is greatest, and lowest near the end of the beam where a least amount of displacement exists.

Figure 13:
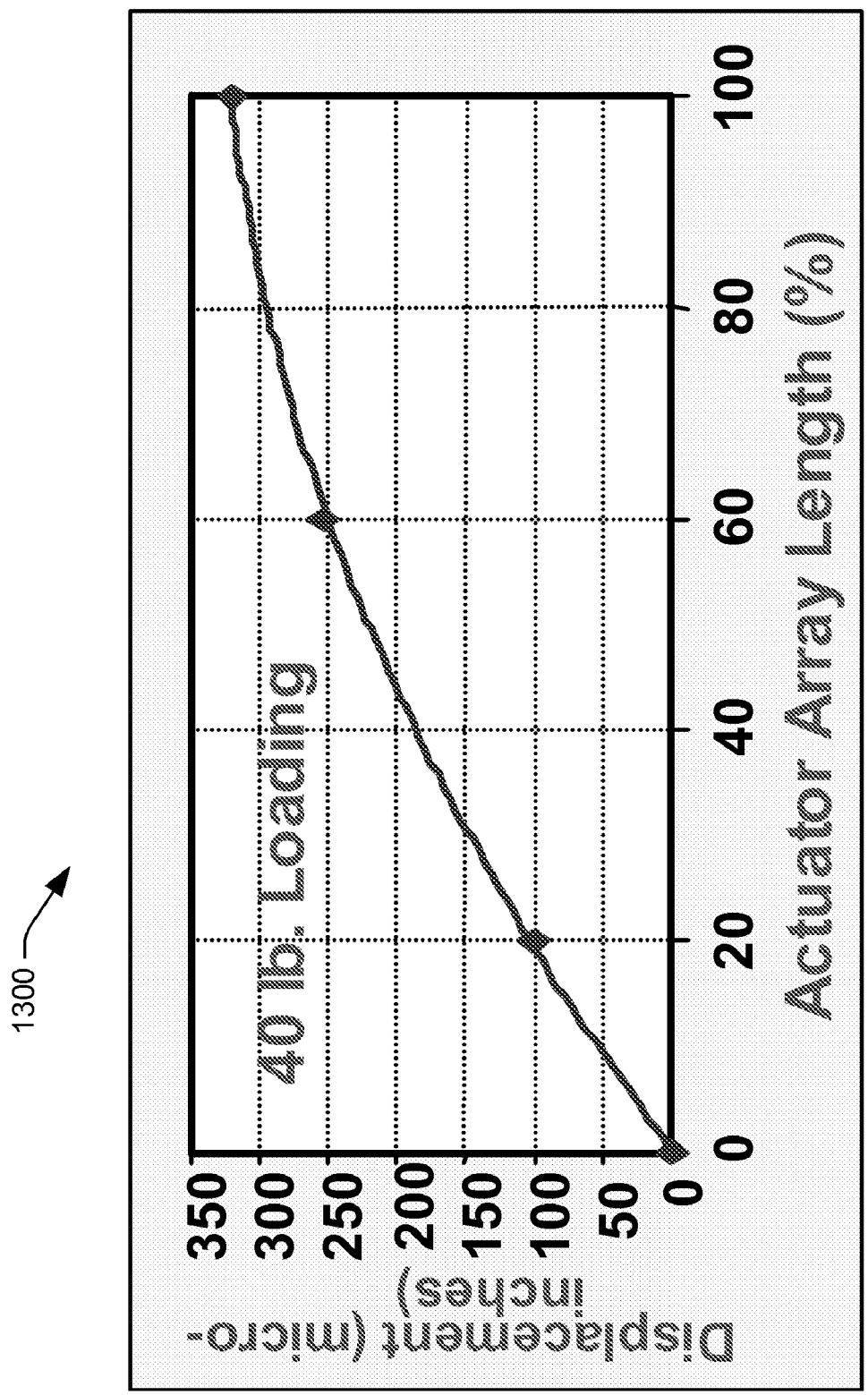
FIG. 13 is a graph that illustrates one or more benefits of a particular piezoelectric actuator that can be employed in connection with the present invention.

Now referring to FIG. 13, a graph 1300 that displays an amount of displacement achieved in a gantry beam with respect to length of a piezoelectric actuator array is illustrated. The piezoelectric actuator array comprises a series of piezoelectric actuators aligned together at the center of the gantry beam and continuing outward. Thus, for example, where no piezoelectric actuators are present there is no displacement of the gantry beam. Where the center-most 20% of the gantry beam is covered by the piezoelectric actuators, the gantry beam is displaced by approximately 100 micro-inches. Moreover, it can be determined by reviewing the graph 1300 that the outermost piezoelectric actuators contribute the least to beam displacement.

Figure 14:
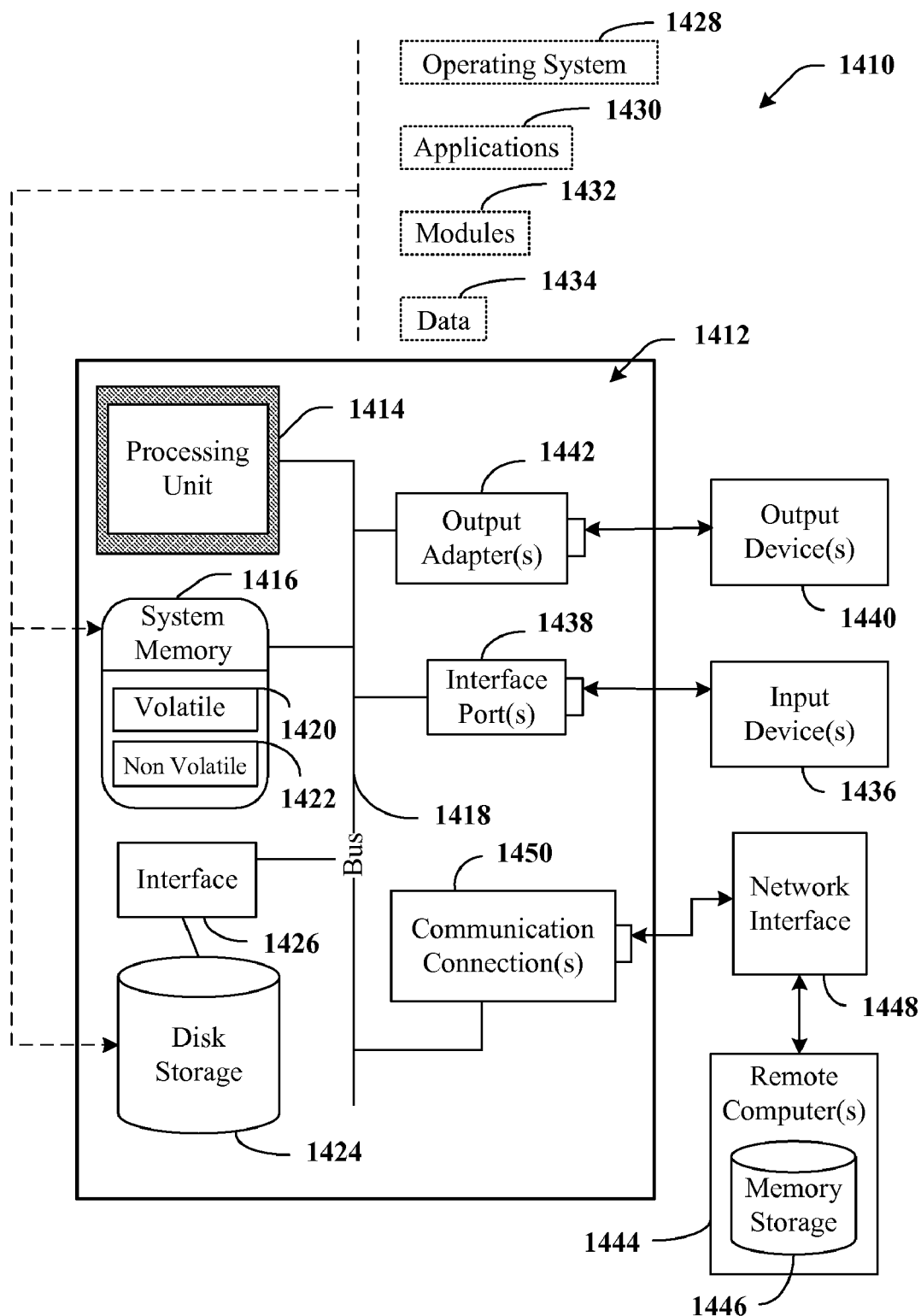
FIG. 14 is an exemplary computing environment that can be employed in connection with the present invention.

With reference to FIG. 14, an exemplary environment 1410 for implementing various aspects of the invention includes a computer 1412. For example, the present invention can employ a control component that utilizes the computer 1412 to control operations of a gantry as well as control an amount of voltage to apply to piezoelectric actuators selectively applied to the gantry. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates active damping of mechanical vibration, comprising:

machinery that is subject to mechanical vibration;

at least one sensor that measures one or more parameters related to mechanical vibration of the machinery;

a plurality of piezoelectric actuators selectively applied to the machinery to facilitate damping of mechanical vibrations;

a voltage component that delivers voltages to at least one of the plurality of piezoelectric actuators to facilitate damping mechanical vibrations associated with the machinery;

a control component that determines the voltages to be delivered by the voltage component based at least in part on the measured parameters, the control component controls movement of the machinery via control commands, the control commands are based on at least one of pre-defined application characteristics, the measured parameters, or output voltages from the plurality of piezoelectric actuators; and a data store that stores the measured parameters, the delivered voltages, and the corresponding control commands.

2. The system of claim 1, the at least one sensor comprising a piezoelectric sensor that produces an output voltage based on a stress or strain in the piezoelectric sensor, the stress or strain corresponds to a force acting on the machinery.

3. The system of claim 1, the control component determines the voltages to be delivered by utilizing at least one of an open-loop algorithm, a closed-loop algorithm, a feedback algorithm, a feed forward algorithm, fuzzy logic, a Bayesian belief network, an artificial intelligence technique, or a PID controller.

4. The system of claim 1, the control component accesses the data store to determine the control commands and the voltages to be delivered.

5. The system of claim 1, the size, type, position, and number of the plurality of piezoelectric actuators is based at least in part on at least one of: the size of the machinery, the shape of the machinery, the composition of the machinery, or the application the machinery is adapted for.

6. The system of claim 1, the plurality of piezoelectric actuators comprising at least one of a stack actuator, a patch actuator, a Moonie actuator, or a Bimorph actuator.

7. The system of claim 1, the machinery comprises a tool attached to a gantry.

8. The system of claim 7, the tool is an optical scanning device.

9. The system of claim 1, the machinery comprising a linear motor that moves at least a portion of the machinery.

10. The system of claim 9, the linear motor is at least one of an iron core linear motor, a brushless linear servo-motor, a brushed linear motor, or a linear step-motor.

11. The system of claim 9, the plurality of piezoelectric actuators comprising a first piezoelectric actuator that damps mechanical vibrations, the first piezoelectric actuator is applied to the linear motor.

12. The system of claim 1, the voltages to be delivered are determined by the control component to substantially offset the mechanical vibration.

13. The system of claim 1, the machinery comprising a gantry, the plurality of piezoelectric actuators are arrayed in a substantially linear arrangement lengthwise along the gantry.

14. A method of actively damping mechanical vibrations, comprising:

measuring one or more parameters related to mechanical vibration of machinery;

selectively applying a plurality of piezoelectric actuators to the machinery to facilitate damping of mechanical vibrations;

delivering voltages to at least one of the plurality of piezoelectric actuators to facilitate damping mechanical vibrations associated with the machinery;

determining the voltages to be delivered by the voltage component based at least in part on the measured parameters;

controlling movement of the machinery via control commands, the control commands are based on at least one of pre-defined application characteristics, the measured parameters, or output voltages from the plurality of piezoelectric actuators; and storing on a data store the measured parameters, the delivered voltages, and the corresponding control commands.

15. The method of claim 14, at least one of the parameters is measured by a piezoelectric sensor that produces an output voltage based on a stress or strain in the piezoelectric sensor, the stress or strain corresponds to a force acting on the machinery.

16. The method of claim 14, further comprising moving the machinery via control commands, the control commands are based on at least one of pre-defined application characteristics, the measured parameters, or output voltages from the plurality of piezoelectric actuators.

17. The method of claim 14, further comprising selecting the size, type, position, and number of the plurality of piezoelectric actuators based at least in part on at least one of: the size of the machinery, the shape of the machinery, the composition of the machinery, or the application the machinery is adapted for.

18. A system that facilitates active damping of mechanical vibration, comprising:

means for measuring one or more parameters related to mechanical vibration of machinery;

means for selectively applying a plurality of piezoelectric actuators to the machinery to facilitate damping of mechanical vibrations;

means for delivering voltages to at least one of the plurality of piezoelectric actuators to facilitate damping mechanical vibrations associated with the machinery; and means for determining the voltages to be delivered by the voltage component based at least in part on the measured parameters;

means for controlling movement of the machinery via control commands, the control commands are based on at least one of pre-defined application characteristics, the measured parameters, or output voltages from the plurality of piezoelectric actuators; and means for storing on a data store the measured parameters, the delivered voltages, and the corresponding control commands.

* * * * *